United States Patent
Sieweke (10) Patent No.: US 8,373,369 B2
(45) Date of Patent: Feb. 12, 2013

(54) METHOD AND AMPLIFIER FOR OPERATING A SYNCHRONOUS MOTOR

(75) Inventor: Frank Sieweke, Leopoldshohe (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 13/240,133

(22) Filed: Sep. 22, 2011

(65) Prior Publication Data

US 2012/0068638 A1 Mar. 22, 2012

Related U.S. Application Data

(63) Continuation of application No. PCT/EP2010/052270, filed on Feb. 23, 2010.

(30) Foreign Application Priority Data

Mar. 27, 2009 (DE) .......................... 10 2009 001 955

(51) Int. Cl.
*H02P 6/00* (2006.01)
*H02P 25/00* (2006.01)
*H02P 27/00* (2006.01)

(52) U.S. Cl. ................... 318/400.01; 318/700; 318/701; 318/717; 318/727; 318/799

(58) Field of Classification Search ............. 318/400.01, 318/700, 701, 717, 727, 799
See application file for complete search history.

(56) References Cited

U.S. PATENT DOCUMENTS

| | | | | |
|---|---|---|---|---|
| 3,896,351 A * | 7/1975 | Blaschke | ....................... | 318/717 |
| 4,814,677 A | 3/1989 | Plunkett | | |
| 5,537,020 A | 7/1996 | Couture et al. | | |
| 6,594,474 B1 * | 7/2003 | Grasset et al. | ............. | 455/127.2 |
| 7,936,145 B2 * | 5/2011 | Schmid | .......................... | 318/727 |
| 7,944,158 B2 * | 5/2011 | Jiang et al. | ........................ | 318/85 |
| 2009/0039825 A1 * | 2/2009 | Stancu et al. | .................. | 318/799 |
| 2011/0050149 A1 * | 3/2011 | Dial | .............................. | 318/701 |

FOREIGN PATENT DOCUMENTS

| | | |
|---|---|---|
| DE | 4407390 | 9/1995 |
| DE | 19604701 | 6/1997 |
| DE | 19637161 | 3/1998 |
| DE | 695 15 519 T2 | 10/2000 |
| DE | 10330551 | 2/2005 |
| DE | 102004012805 | 10/2005 |
| DE | 102005059477 | 6/2007 |
| EP | 0517393 | 12/1992 |
| EP | 0784378 | 7/1997 |

OTHER PUBLICATIONS

International Search Report issued in PCT/EP2010/052270. 5 pages. Aug. 5, 2011.
R. Schönfeld, W. Hofmann: "Elektrische Antriebe und Bewegungssteuerungen", p. 309, 310 VDE-Verlag (editor), 2005. 4 ages.
Danaher Applikationsschrift dated Aug. 5, 2007. 10 pages.

* cited by examiner

*Primary Examiner* — Walter Benson
*Assistant Examiner* — Gabriel Agared
(74) *Attorney, Agent, or Firm* — Dorsey & Whitney LLP (57) ABSTRACT

A method for operating a synchronous motor wherein a magnetic field is generated by a first motor component in a predetermined orientation, the method including generating a relative movement between the first and a second motor component limited to a predetermined value, and determining a direction of the relative movement, wherein the generating and determining are repeated until a change in the direction of the relative movement occurs, wherein a magnetic field having a changed orientation with regard to a previously generated magnetic field is generated by the first motor component, and wherein the orientation of the magnetic field with the changed orientation is changed by a predetermined orientation section and depending on the determined direction of the relative movement. The invention encompasses an amplifier for operating a synchronous motor and a system including an amplifier and a synchronous motor.

17 Claims, 5 Drawing Sheets

METHOD AND AMPLIFIER FOR OPERATING A SYNCHRONOUS MOTOR

CROSS-REFERENCE TO RELATED APPLICATIONS

This application is a continuation of International Patent Application No. PCT/EP2010/052270, filed on Feb. 23, 2010, which claims priority to German Patent Application No. 10 2009 001 955.3-32, filed on Mar. 27, 2009, the entire contents of both of which are hereby incorporated herein by reference. in their entirety.

BACKGROUND

The present invention relates to a method for operating a synchronous motor comprising a first motor component and a second motor component, wherein the first and the second motor component are movable relative to each other. The invention further relates to an amplifier for operating such a synchronous motor as well as to a system comprising an amplifier and a synchronous motor.

Synchronous motors comprising a first and a second motor component which are configured in such a way that they may be moved relative to each other are known in various embodiments. In a rotary embodiment, one of the motor components may be rotated with regard to the other motor component. In what is referred to as a linear drive or linear motor, respectively, a first or a second motor component may be displaced with regard to each other in a linear movement (translational movement).

In all these various embodiments, the initiation of a movement is based on an interaction of magnetic fields. In this context, a magnetic field with rotary or translational movement (rotary field or, respectively, travelling field) is generated with the first motor component by means of electromagnets (current-carrying conductors or, respectively, coils). The second motor component comprises one or more permanent magnets so that a static magnetic field is provided with regard to the second motor component. The magnetic field of the first motor component interacts with the static field of the second motor component so that the first and second motor component are moved relatively to each other.

In order to generate a moving magnetic field, the electromagnets of the first motor component are actuated or, respectively, provided with a current at a timely displacement with regard to each other. This current transfer from one electromagnet to the next is also referred to as commutation. For effective operation of a synchronous motor, it is required to harmonize the point of time of the commutation with respect to the magnetic field of the second motor component.

In the case of a mechanical commutation, sliding contacts (usually in the shape of brushes) are used in a predetermined geometrical arrangement so that during a relative movement of the first and the second motor component the current flow is switched over accordingly. In this way, commutation may be realized involving relatively little complexity, however, wear on the brushes or, respectively, loss of the brushes during operation are disadvantageous, as well as undesired effects such as extensive sparking. Current synchronous motors are thus usually operated by means of electronic commutation. For this purpose, electronic control devices, also referred to as servo-amplifiers, are assigned to the motors in order to be able to generate the rotary field necessary for motor operation without wear and in a smooth manner.

Aligning the rotary magnetic field generated by means of the first motor component with the static magnetic field of the second motor component within the framework of an electronic commutation, however, requires knowledge of the spatial position of the first and the second motor component in relation to each other. This is significant at the start of the operation of a synchronous motor in order to allow for an effective operational mode with a maximum torque utilization. As a result, position-determining devices are used which are also referred to as encoders or, respectively, encoding systems. These may be configured as what is referred to as absolute encoders in order to allow for unambiguously determining the position of a motor component. It is, however, disadvantageous that the use of such an absolute encoder is attended by relatively high costs.

DE 10 2004 012 805 A1 describes a method for determining the angular position (orientation) of a rotor of an electric motor comprising permanent magnets. In the method, it is proposed to apply current pulses to windings (electromagnets) of a stator of the electric motor according to a predetermined pulse pattern, to measure the angular acceleration of the rotor occurring thereby by means of an acceleration sensor and to calculate the sought-after rotor position on the basis of these data.

EP 0 784 378 A2 refers to a method for determining the absolute rotor position of a synchronous machine. In this context, a magnetic field is generated by means of electromagnets of a stator, the rotary movement of a permanently energized rotor occurring thereby is detected and the orientation of the magnetic field of the stator is changed or, respectively, rotated within the framework of a control method until the rotary movement of the rotor comes to a halt. In this state, the orientations or, respectively, angular positions of the magnetic fields of rotor and stator are congruent, thus determining in the sought-after rotor position.

R. Schönfeld, W. Hofmann, "Elektrische Antriebe and Bewegungssteuerungen", pp. 309-310, VDE (publisher), 2005 discloses methods for determining the position of initial angles of electric motors. According to one method, the application of a magnetic field is provided in order to align a permanently energized rotor therewith.

DE 44 07 390 A1 refers to a method for the start-up phase and the commutation of synchronous machines. This method proposes a test excitation of a rotor by applying polyphase-currents to windings of a stator. Moreover, the maximum torque achieved thereby is determined. The phase of the stator currents associated with the maximum torque is used as commutation angle for the initial operation of the synchronous motor.

SUMMARY

Various aspects of the present invention provide an improved method and an improved amplifier for operating a synchronous motor, as well as an improved system comprising an amplifier and a synchronous motor.

One embodiment of the present invention provides a method for operating a synchronous motor, the synchronous motor comprising a first motor component and a second motor component which are movable relative to each other. The first motor component is configured to generate a magnetic field. The second motor component comprises a magnetic field which is static with regard to the second motor component. In the case of a difference in the orientation between the magnetic fields of the first and the second motor component, the first and the second motor component are moved relatively to each other. The magnetic field of the first motor component is gradually aligned in the direction of the magnetic field of the second motor component by carrying out the following method steps. In a method step a), a magnetic field is generated by means of the first motor component in a predetermined orientation in order to generate a relative movement between the first and the second motor component limited to a predetermined value. In a method step b), a direction of movement of the limited relative movement between the first and the second motor component is determined. In a method step c), method steps a) and b) are repeated until a change in the direction of movement of the limited relative movement between the first and the second motor component occurs. During repetition of the method steps a) and b), in each case in method step a) a magnetic field having a changed orientation with regard to the previously generated magnetic field is generated by means of the first motor component, wherein the orientation of the magnetic field is respectively changed by a predetermined orientation section and depending on the determined direction of movement.

Another embodiment of the present invention provides an amplifier for operating a synchronous motor, the synchronous motor comprising a first motor component, a second motor component and an encoder. The first motor component is configured to generate a magnetic field. The second motor component comprises a magnetic field which is static with regard to the second motor component. In the case of a difference in the orientation between the magnetic fields of the first and the second motor component, a relative movement between the first and the second motor component occurs which is determinable by means of the encoder. The amplifier comprises a power unit and a control unit. The power unit is configured to provide an electric current to the first motor component for generating a magnetic field in different orientations. The control unit is configured to control the power unit and to evaluate the relative movement determined by means of the encoder. The control unit is further configured to initiate a gradual alignment of the magnetic field of the first motor component in the direction of the magnetic field of the second motor component within the framework of starting the operation of the synchronous motor, which is effected in that the control unit initiates in a method step a) the generation of a magnetic field by means of the first motor component in a predetermined orientation in order to generate a relative movement between the first and the second motor component limited to a predetermined value, determines in a method step b) a direction of movement of the limited relative movement between the first and the second motor component by means of the encoder, and repeats the two method steps a) and b) until a change in the direction of movement of the limited relative movement between the first and the second motor component occurs. During repetition of the method steps a) and b), the control unit in each case initiates in method step a) that the magnetic field is generated by means of the first motor component having a changed orientation with regard to the previously generated magnetic field, wherein the orientation of the magnetic field is respectively changed by a predetermined orientation section and depending on the direction of movement determined by means of the encoder.

Another embodiment of the present invention provides a system comprising an amplifier and a synchronous motor. The synchronous motor comprises a first motor component, a second motor component and an encoder. The first motor component is configured to generate a magnetic field. The second motor component comprises a magnetic field which is static with regard to the second motor component. In the case of a difference in the orientation between the magnetic fields of the first and the second motor component, a relative movement between the first and the second motor component occurs which is determinable by means of the encoder. The amplifier comprises a power unit and a control unit. The power unit is configured to provide an electric current to the first motor component for generating a magnetic field in different orientations. The control unit is configured to control the power unit and to evaluate the relative movement determined by means of the encoder. The control unit is further configured to initiate a gradual alignment of the magnetic field of the first motor component in the direction of the magnetic field of the second motor component within the framework of starting the operation of the synchronous motor, which is effected in that the control unit initiates in a method step a) the generation of a magnetic field by means of the first motor component in a predetermined orientation in order to generate a relative movement between the first and the second motor component limited to a predetermined value, determines in a method step b) a direction of movement of the limited relative movement between the first and the second motor component by means of the encoder, and repeats the two method steps a) and b) until a change in the direction of movement of the limited relative movement between the first and the second motor component occurs. During repetition of the method steps a) and b), the control unit in each case initiates in method step a) that the magnetic field is generated by means of the first motor component having a changed orientation with regard to the previously generated magnetic field, wherein the orientation of the magnetic field is respectively changed by a predetermined orientation section and depending on the direction of movement determined by means of the encoder.

DETAILED DESCRIPTION

In the following, reference is made to embodiments of the invention. However, it should be understood that the invention is not limited to specific described embodiments. Instead, any combination Of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention provides a method for operating a synchronous motor, by means of which a first and a second motor component of the synchronous motor or, respectively, the magnetic fields of the same may be adjusted to each other in a relatively simple manner within the framework of an operational start of the synchronous motor. The first motor component and the second motor component are movable relative to each other. By means of the first motor component, a magnetic field may be generated. The second motor component comprises a static magnetic field with regard to the second motor component. If a difference occurs in the orientation between the magnetic fields of the first and the second motor component, the first and the second motor component are moved relatively to each other. In the method, a magnetic field is generated by means of the first motor component in a predetermined orientation in a method step a) in order to generate a relative movement between the first and the second motor component, which is limited to a predetermined value. In a method step b), a direction of movement of the limited relative movement between the first and the second motor component is determined. The method steps a) and b) are repeated until a change in the direction of movement of the limited relative movement occurs between the first and the second motor component. In this context, in each case in method step a) a magnetic field having a changed orientation with regard to the previously generated magnetic field is generated by means of the first motor component, the orientation of the magnetic field being respectively changed by a predetermined orientation section and depending on the determined direction of movement.

The method according to the invention may be applied to rotary as well as to linear synchronous motors. By means of the method, the magnetic field of the first motor component may gradually be aligned in the direction of the magnetic field of the second motor component. The relative movement between the first and the second motor component caused thereby due to the interaction of the magnetic fields is limited to a predetermined value so that carrying out the method merely requires a relatively low overall movement of a motor component. In order to determine the direction of movement of a relative movement of the first and the second motor component, a relatively simple encoder, such as e.g. an incremental encoder, may be used, thus rendering execution of the method inexpensive.

As soon as the direction of movement of the relative movement between the first and the second motor component reverses, it is achieved that in the present spatial position of the first and the second motor component a difference in the orientation between the magnetic field of the second motor component and the magnetic field generated lastly by means of the first motor component is smaller than a difference of the orientations between the two last magnetic fields generated by means of the first motor component. In other words, the orientation of the magnetic field of the second motor component lies "between" the orientations of the two last magnetic fields generated by means of the first motor component. The magnetic fields of the first and second motor component may be "roughly" adjusted to each other in this manner.

In a possible embodiment, the first motor component is stationary and the second motor component is movable with regard to the first motor component. This embodiment may be considered with respect to a rotary synchronous motor in which the first motor component is configured as a stator and the second motor component is configured as a rotor. In this context, the orientation of the magnetic field generated by means of the first motor component is in each case changed in a direction which is opposite to the determined direction of movement (movement of the second motor component).

In an alternative embodiment, the second motor component is stationary while the first motor component is movable with regard to the second motor component. This embodiment may be considered with respect to a linear synchronous motor in which the first motor component is configured as a slidable primary component and the second motor component is configured as a stationary secondary component. In this context, the orientation of the magnetic field generated by means of the first motor component is changed in each case in a direction with corresponds to the determined direction of movement (movement of the first motor component).

Upon "roughly" adjusting the magnetic fields of the first and the second motor component, the magnetic fields may furthermore be "precisely" adjusted or, respectively, rendered congruent with regard to each other. Starting form this state, the synchronous motor may be put into its actual state of operation in order to carry out a rotary or translational movement. Different embodiments may be used for a precise adjustment of the magnetic fields.

In a possible embodiment, a further magnetic field is generated by means of the first motor component after repeating the method steps a) and b) and determining the change or, respectively, reversal of the direction of movement, wherein the orientation of the further magnetic field is chosen to be in the middle between the orientations of the two magnetic fields generated lastly by means of the first motor component and the strength of the further magnetic field is increased starting from zero up to a predetermined value. This procedure offers the opportunity of bringing the magnetic fields of the first and the second motor component into a congruent state in a relatively simple manner. The relative movement of the first and the second motor component occurring thereby corresponds at most to half the distance (translational movement) or of the angular range (rotary movement), respectively, between the orientations of the magnetic fields generated lastly by means of the first motor component. "Rocking" does hereby not occur between the first and the second motor component which makes the method robust and suitable for synchronous motors with low absorption or, respectively, adhesive friction. For example, ironless linear drives with air bearing fall within this category. Even for synchronous motors having a relatively high absorption, said method may prove to be advantageous.

In an alternative embodiment, after repeating the method steps a) and b) and determining the change of the direction of movement, a further magnetic field is generated by means of the first motor component starting from the last orientation, and the relative movement between the first and the second motor component is determined, wherein the strength of the further magnetic field is increased starting from zero up to a predetermined value and the orientation of the further magnetic field is changed until the relative movement between the first and the second motor component comes to a halt or only a minimal relative movement occurs, respectively. Thus, this procedure allows for making congruent the magnetic fields of the first and the second motor component involving a relatively small relative movement.

In a further embodiment, method step a) comprises increasing the strength of the magnetic field starting from zero. Furthermore, the relative movement caused in method step a) between the first and the second motor component is terminated after passing through the predetermined value of the relative movement, which may be effected by switching off the magnetic field generated by means of the first motor component.

In a further embodiment, a different orientation is predefined in case that during a first generation of a magnetic field by means of the first motor component in the predetermined orientation no relative movement is generated between the first and the second motor component in method step a), and method step a) is carried out again with the different orientation. This case of a non-movement e.g. occurs in rotary synchronous motors, provided that the magnetic field of the first motor component is generated with an orientation which is displaced by a 180° angle with regard to the orientation of the magnetic field of the second motor component. It is also possible that the magnetic field of the first motor component is generated with the same orientation as the magnetic field of the second motor component. Since a distinction cannot be made between these two cases, it is proposed to generate the magnetic field of the first motor component with a different orientation. In a rotary synchronous motor, the different orientation may e.g. be chosen to be rotated by a 90° angle with regard to the previous orientation.

The present invention furthermore provides an amplifier for operating a synchronous motor. The synchronous motor comprises a first motor component, a second motor component and an encoder. By means of the first motor component, a magnetic field may be generated. The second motor component comprises a magnetic field which is static with regard to the second motor component. In the case of a difference in the orientation between the magnetic fields of the first and the second motor component, a relative movement between the first and the second motor component occurs which is determinable by means of the encoder. The amplifier according to the invention comprises a power unit and a control unit. The power unit is configured to provide an electric current to the first motor component for generating a magnetic field in different orientations. The control unit of the amplifier is configured to control the power unit and to evaluate the relative movement determined by means of the encoder. The control unit is further configured to initiate, within the framework of starting the operation of the synchronous motor, in a method step a) the generation of a magnetic field by means of the first motor component in a predetermined orientation in order to generate a relative movement between the first and the second motor component limited to a predetermined value, to determine in a method step b) a direction of movement of the limited relative movement between the first and the second motor component by means of the encoder, and to repeat the two method steps a) and b) until a change in the direction of movement of the limited relative movement between the first and the second motor component occurs. In this context, the control unit in each case initiates in method step a) that the magnetic field is generated by means of the first motor component having an orientation which is changed with regard to the previously generated magnetic field, wherein the orientation of the magnetic field is respectively changed by a predetermined orientation section and depending on the direction of movement determined by means of the encoder.

The amplifier according to the invention may be used for operating a rotary as well as a linear synchronous motor. Corresponding to the above-described method, the amplifier allows for a "rough" adjustment of the magnetic fields of the first and second motor component with a relatively low overall movement of a motor component. Subsequently, the magnetic fields may be rendered congruent by means of the amplifier.

A system comprising such an amplifier and a synchronous motor may have the same advantages.

Further embodiments are explained in more detail in conjunction with the accompanying drawings.

Figure 1:
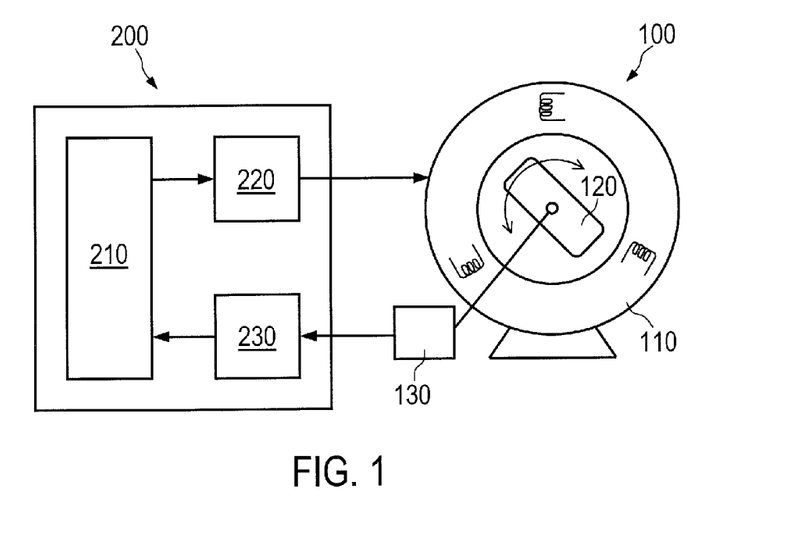
FIG. 1 is a schematic view of a system comprising a rotary synchronous motor and a servo-amplifier.

FIG. 1 shows a schematic view of a system comprising a rotary synchronous motor 100 and an amplifier 200 connected to the synchronous motor 100 for control of the synchronous motor 100. The synchronous motor 100 which is also referred to as servomotor comprises a stationary stator 110 and a rotor 120 rotatably arranged within the stator 110. The rotor 120 is provided with one or ore permanent magnets and thus comprises a consistent or, respectively, static magnetic field. In comparison thereto, the stator 110 comprises a number of electromagnets which are indicated in FIG. 1 by means of three coils. By actuating the electromagnets with a timely displacement, it is possible to generate a magnetic rotary field which interacts with the static magnetic field of the rotor 120, which puts the rotor 120 into a rotary motion.

The amplifier 200, which is also referred to as servo-amplifier, comprises a control unit 210, a power unit 220 and a position-detecting unit (rev-counter) 230. The position-detecting unit 230 may also be configured as an integrated component of the control unit 210 (contrary to the depiction in FIG. 1). The stator 110 may be provided with an electric current or, respectively, rotary current for generating the magnetic rotary field via the power unit 220. In this context, the electromagnets of the stator 110 are provided with a rotary current with a phase-shift with regard to each other. At this, the power unit 220 is controlled by the control unit 210.

The position-detecting unit 230 serves to detect the relative change in position of the rotor 120 and to provide it to the control unit 210 for controlling the power unit 220. For this purpose, the position-detecting unit 230 of the amplifier 200 is connected to an incremental encoder 130 associated with the synchronous motor 100. The encoder 130 is configured to transfer corresponding impulses or, respectively, signals occurring during the rotary movement of the rotor 120 to the position-detecting unit 230, by means of which the position-detecting unit 230 may determine the rotary direction and the relative movement of the rotor 120. In this context, the encoder 130 may determine the rotary movement of the rotor 120 in a mechanic, optic or electromagnetic manner.

Figure 2:
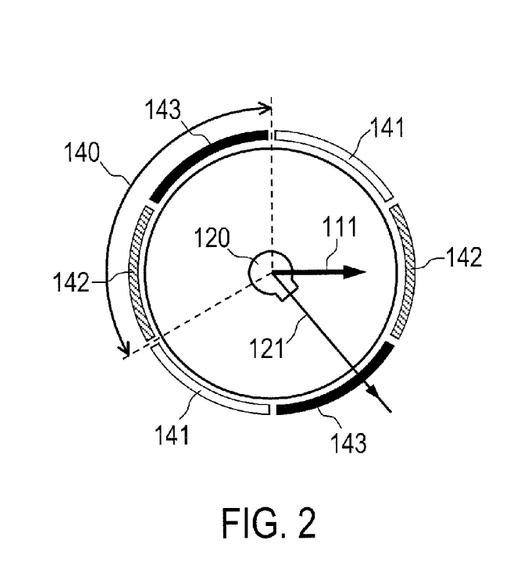
FIG. 2 is a schematic view of the synchronous motor of FIG. 1 having three pole pairs.

In a schematic view, FIG. 2 shows the synchronous motor 100 and the magnetic fields of the stator 110 and the rotor 120 occurring during operation of the synchronous motor 100, respectively. The magnetic field electrically generated by means of the stator 110 is depicted by means of a pointer or, respectively, vector 111 which will be referred to as stator-flux vector 111 in the following. The magnetic field of the rotor 120 is depicted by a pointer or, respectively, vector 121 which will be referred to as rotor-flux vector 121 in the following. In case of a different orientation of the magnetic fields of stator 110 and rotor 120, i.e. a different orientation of the stator-flux vector 111 and the rotor-flux vector 121, the rotor-flux vector 121 and thus the rotor 120 is rotated in the direction of the stator-flux vector 111. (Continuously) rotating the stator-flux vector 111 during operation of the synchronous motor 100 thus leads to a rotary movement of the rotor 120.

In FIG. 2, an embodiment of the synchronous motor 100 having six poles is indicated. In this context, the stator 110 comprises six magnetic poles 141, 142, 143 for generating the stator-flux vector 111, which are each combined as pole pairs. In this context, each pole pair may be provided via three coils (coil triplet). In such an embodiment with the pole-pair number three, the application of the alternating current to the stator 110 over time—which is also referred to as "electrical" rotation—results in a "mechanical" rotation of the stator-flux vector 111 which amounts to one third of the electrical rotation. A complete electrical rotation during a period (360°) thus results in a mechanical rotation 140 amounting to 120°, as shown in FIG. 2.

Figure 3:
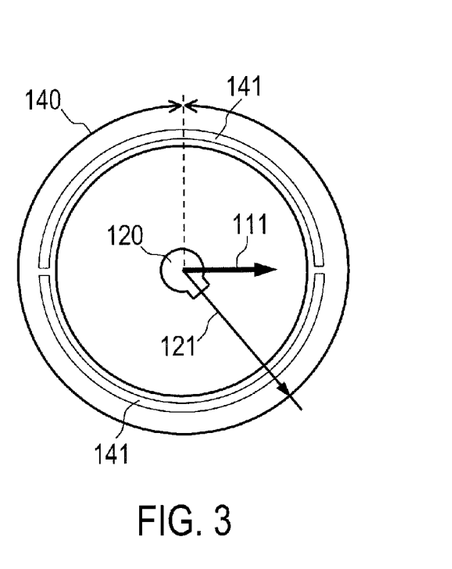
FIG. 3 is a schematic view of the synchronous motor of FIG. 1 having one pole pair.

For the following description, the embodiment of the synchronous motor 100 with only one pole pair 141 forms the basis, as schematically depicted in FIG. 3. In such a case, an electrical rotation corresponds to a mechanical rotation 140 of the stator-flux vector 111, which simplifies subsequent considerations. The following description may, however, be applied correspondingly to the synchronous motor 100 having a different pole pair number such as the embodiment with six poles depicted in FIG. 2.

In the system depicted in FIG. 1, the encoder 130 associated with the synchronous motor 100 is configured as an inexpensive incremental encoder by means of which a rotary movement of the rotor 120 may be detected, however, not its absolute position. When starting the operation of the synchronous motor 100, the position of the rotor 120 and thus the orientation of the static magnetic field or, respectively, of the rotor-flux vector 121 are for this reason unknown. As a result, generating a rotating stator-flux vector 111 by applying a rotary current to the stator 110 in order to initiate a rotary movement of the rotor 120 in such an undefined position might have negative results such as a loss of torque, a fitful rotor movement, an uncontrollable control process, damage of the synchronous motor 100 or of devices coupled to the synchronous motor 100, etc. In order to avoid such adverse effects, it is provided to roughly adjust the magnetic fields of the stator 110 and the rotor 120 to each other in a first stage, wherein rough adjustment is carried out with a relatively low overall movement of the rotor 120. In a second stage, precise adjustment may be effected, and starting from this state, the synchronous motor 100 may be put into its actual state of operation in which the rotor 120 carries out a (continuous) rotary movement.

Figure 4A:
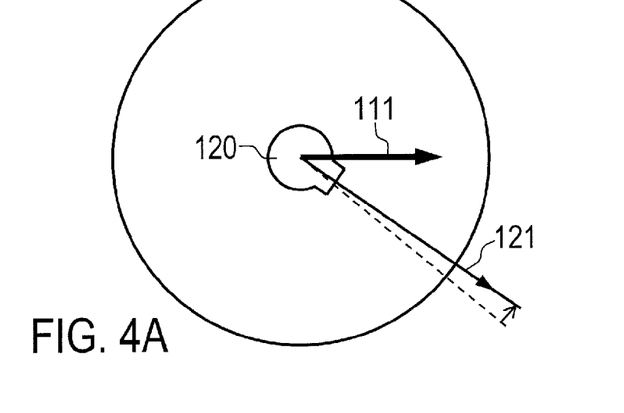
FIGS. 4A to 4C depict the synchronous motor of FIG. 3 during an operational state for roughly adjusting magnetic fields of the synchronous motor.
Figure 4B:
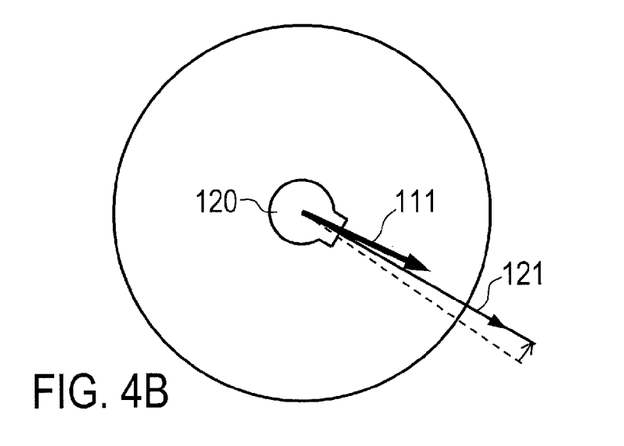
Figure 4C:
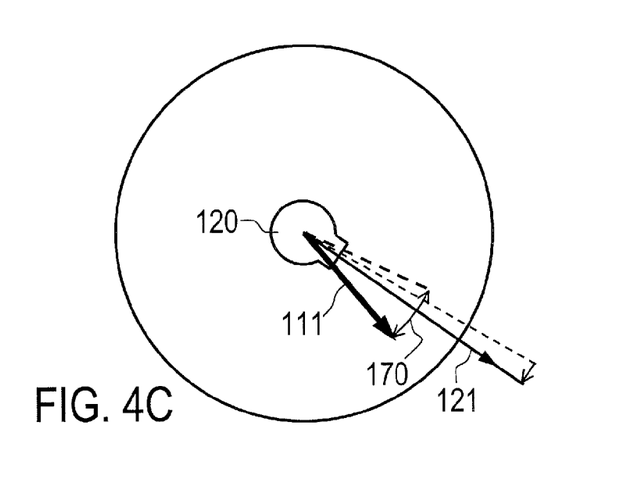

FIGS. 4A to 4C illustrate the rough adjustment of the magnetic fields or, respectively, vectors 111, 121 of stator 110 and rotor 120. In this context, the control unit 210 initiates the power unit 220 to "turn up" the stator-flux vector 111 in a first orientation, i.e. to increase the strength of the respective magnetic field in this orientation starting from zero up to a predetermined value (FIG. 4A). The first orientation may e.g. be arbitrarily chosen by the control unit 210 or may be predefined.

Generally, the first orientation of the stator-flux vector 111 as depicted in FIG. 4A is different from that of the rotor-flux vector 121 so that the rotor-flux vector 121 and thus the rotor 120 is drawn in the direction of the stator-flux vector 111 by the increasing magnetic force. The rotary movement of the rotor 120 is determined by the encoder 130 and by the position-detecting unit 230, and the rotary direction determined thereby is provided to the control unit 210.

The rotary movement occurring at the rotor 120 is limited to a minimal angular value (such as e.g. 0.5°) which is sufficient to determine a rotary direction of the rotor movement by means of the encoder 130 and the position-detecting unit 230. This may e.g. be effected by the control unit 210 causing the power unit 220 to switch off the stator-flux vector 111 immediately upon receiving the information on the direction of rotation of the rotor 120.

Subsequently, the control unit 210 causes the power unit 220 to turn up the stator-flux vector 111 again, as depicted in FIG. 4B, however, with an orientation which is changed by an angular shift 170 (cf. FIG. 4C) with regard to the first orientation. The angular shift 170 is e.g. 22.5°. At this, the (new) orientation of the stator-flux vector 111 is changed depending on the previously determined rotary direction of the rotor 120 in order to change the orientation of the stator-flux vector 111 to be closer to the rotor-flux vector 121. Since in the present case the stator 110, by means of which the stator-flux vector 111 is generated, is stationary and the rotor 120 with the rotor-flux vector 121 may be rotated, the orientation of the stator-flux vector 111 is changed in a direction opposite to the previously determined rotary direction of the rotor 120.

With respect to turning up the stator-flux vector 111 again, as depicted in FIG. 4B, the rotary direction of the rotary movement of the rotor 120, which is reduced to a minimum angular value, is again determined by means of the encoder 130 and the position-detecting unit 230 and provided to the control unit 210. The rotary direction in the present case is the same as for the stator-flux vector 111 generated previously in the orientation according to FIG. 4A.

The amplifier 200 or, respectively, the control unit 210 are configured to successively repeat these method steps of generating a stator-flux vector 111 (comprising an orientation respectively changed by the angular shift 170) and of determining a rotary direction of the limited rotary movement of the rotor 120 until the stator-flux vector 111 "overtakes" the rotor-flux vector 121 and the rotary direction of the rotor 120 reverses as a result, as depicted in FIG. 4C. In the exemplary sequence of FIGS. 4A to 4C, starting from the "initial situation" in FIG. 4A, this state is already reached in the third orientation of the stator-flux vector 111. In this state, the stator-flux vector 111 and the rotor-flux vector 121 (or their orientations, respectively, since the stator-flux vector 111 is switched off after passing through the limited rotary movement of the rotor 120) are roughly adjusted to each other. In this context, the rotor-flux vector 121 is within the angular sector or, respectively, angular shift 170 which is provided by the two lastly turned-up stator-flux vectors 111.

In order to further illustrate the rough adjustment explained with reference to FIGS. 4A to 4C, FIG. 5 shows an exemplary diagram in which the rotary movement of the rotor 120, indicated by line 150, and a target-value pre-selection for the strength of the stator-flux vector 111 generated within the control unit 210 and indicated by line 160, is illustrated with respect to time (in ms). According to the target-value pre-selection 160, the stator-flux vector 111 is turned up linearly to a preselected value 161 in a duration of time 162 starting from zero for each selected orientation, and subsequently kept at said preselected value 161. The duration of time 162 is e.g. 100 ms, and the preselected value 161 is e.g. 50% of a provided maximum strength of the stator-flux vector 111.

Figure 5:
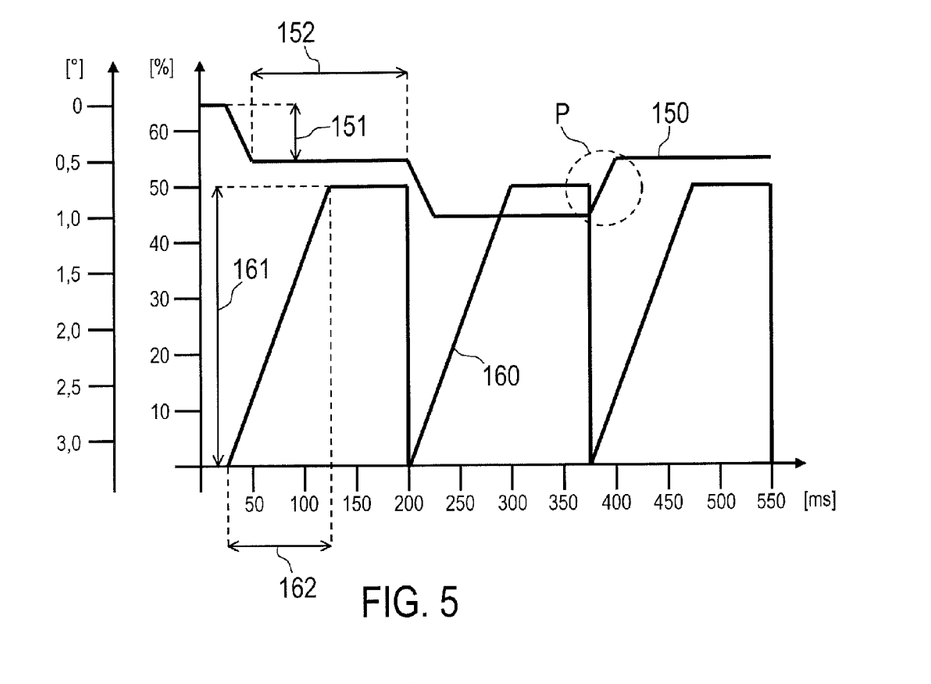
FIG. 5 is an exemplary diagram of a rotor movement and a target-value selection of a magnetic flux vector during the rough adjustment of the synchronous motor.

By turning up the stator-flux vector 111, the rotor 120 carries out a corresponding rotary movement 150. As described above, the rotary movement 150 of the rotor 120 is e.g.

limited to an angle of rotation 151 amounting to 0.5°, which is effected by a switching-off of the stator-flux vector 111 initiated by the control unit 210. However, as indicated in FIG. 5, the target-value pre-selection 160 may continue during this process within the control unit 210.

Subsequently to the passing-through the angle of rotation 150 or, respectively, to the movement determination enabled by the passing-through of the angle of rotation 151, a duration of time 152 (e.g. 150 ms) is awaited until the stator-flux vector 111 is again turned up with a different orientation and the rotor 120 again rotates by the limited angle of rotation 151. Awaiting the duration of time 152 is e.g. provided so that the system or, respectively, the synchronous motor 100 which may oscillate due to the rotary movement, may calm down. This process of successively turning-up the stator-flux vector 111 and determining the rotor movement taking place around the angle of rotation 151, respectively, is repeated until the direction of rotation of the rotor 120 reverses (cf. the area P in FIG. 5 illustrated by a dashed circle).

In FIG. 5, the rotary movement 150 is depicted during passing-through the angles of rotation 151 with a constant slope. In real operation, however, the slope may change depending on the angle of rotation 151 or, respectively, may become smaller since the strength of the attractive interaction between the stator-flux vector 111 and the rotor-flux vector 121 becomes smaller with increasing "approximation" of the vectors 111, 121. In this way, the movement of the rotor 120 may extend further into a "step" of the target-value preselection 160 than is illustrated in FIG. 5.

Subsequently to the rough adjustment of the magnetic fields of stator 110 and rotor 120 or, respectively, the associated vectors 111, 121, the magnetic fields may further be precisely adjusted to each other or, respectively, rendered congruent, i.e. brought into the same phase. Starting from this state, the synchronous motor 100 may be put into its proper operational state in order to generate a rotary movement of the rotor 120 by rotating a stator-flux vector 111 (rotary field). Different embodiments may be used for precise adjustment.

Figure 6:
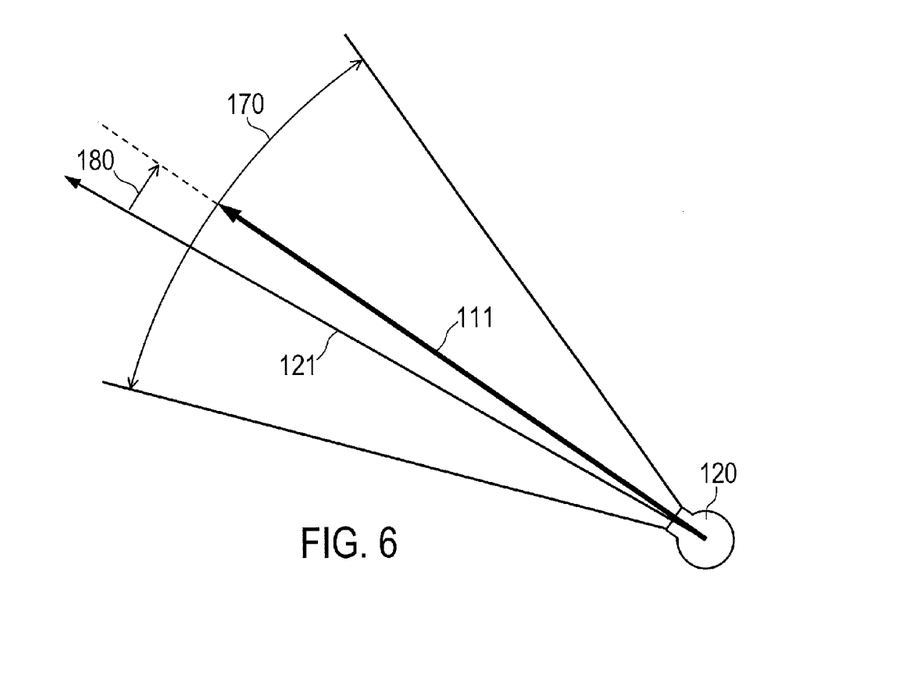
FIG. 6 shows the synchronous motor of FIG. 3 during an operational state for precisely adjusting magnetic fields.

A possible procedure for precise adjustment is depicted schematically in FIG. 6. During this process, the control unit 210 initiates the power unit 220 to again generate or, respectively, turn up the stator-flux vector 111, the orientation of which is chosen to be in the middle between the orientations of the two lastly generated stator-flux vectors 111. In this (constant) orientation, the strength of the stator-flux vector 111 is increased to a specified value, starting from zero. This results in the rotor 120 being drawn in the direction of the stator-flux vector 111 due to the increasing magnetic force between the rotor-flux vector 121 and the stator-flux vector 111, until the two vectors 111, 121 are congruent. The rotary movement 180 of the rotor 120 occurring thereby corresponds at most to half of the angular shift 170 used during rough adjustment.

By means of this "firm" alignment of the rotor 120 to the stator-flux vector 111, rocking in a rotary movement of the rotor 120 may be avoided. As a result, this robust method is suitable for synchronous motors 100 in which a low absorption or, respectively, adhesive friction of the rotor 120 occurs. The method, however, is not limited to synchronous motors 100 having such properties but may also prove advantageous e.g. in case of a relatively high adhesive friction.

Figure 7:
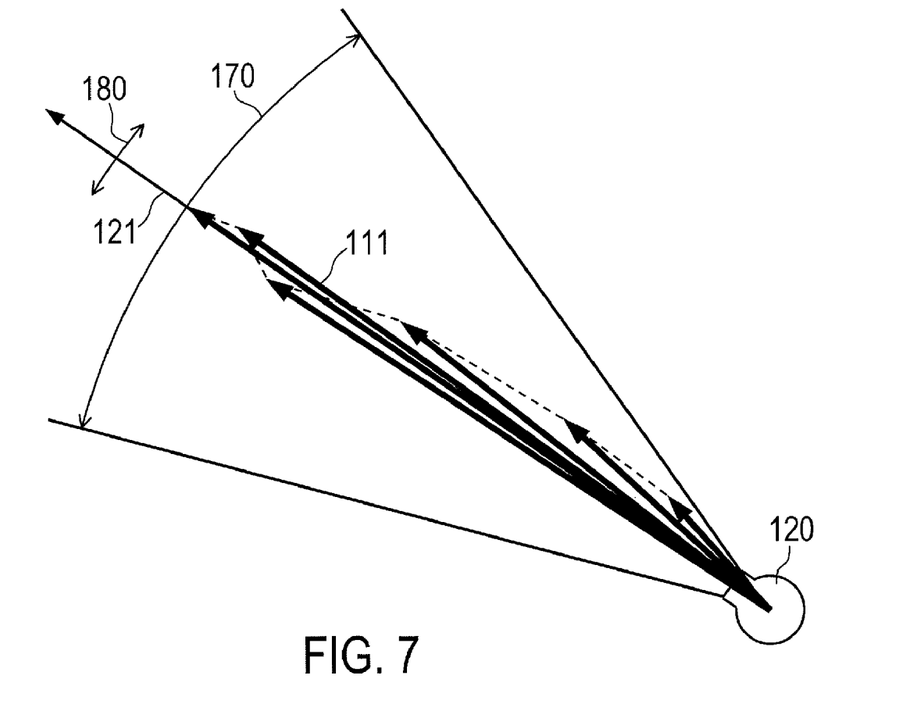
FIG. 7 depicts the synchronous motor of FIG. 3 during a further operational state for precisely adjusting magnetic fields.

An alternative method for precise adjustment controlled by the control unit 210 is schematically depicted in FIG. 7. In this context, the stator-flux vector 111 is generated starting from the lastly chosen orientation during rough adjustment and the rotary movement of the rotor 120 is determined continuously. The stator-flux vector 111 is again turned-up from zero up to a specified value, and the orientation of the stator-flux vector 111 is adapted according to the determined rotor movement until the rotary movement of the rotor 120 comes to a halt. At this, the rotor 120 may be in the same position as at the beginning of precise adjustment.

By means of this "correction", bringing the vectors 111, 121 into a congruent state is made possible by means of a relatively small rotary movement 180 of the rotor 120. This requires, however, that the rotor 120 is not subject to a too small or too large adhesive friction in order to avoid rocking or a fitful movement of the rotor 180 (when overcoming adhesive friction). At this, turning up the stator-flux vector 111 to the predetermined value may be carried out during a time period of e.g. 500 ms. The stator-flux vector 111 may furthermore be kept at the predetermined value for a predetermined amount of time which may e.g. be 3000 ms.

The method explained with reference to FIGS. 4A to 4C for roughly adjusting the vectors 111, 121 is based on the fact that during turning-up of the stator-flux vector 111, the rotor 120 carries out a rotary movement. During a first turning-up of the stator-flux vector 111, however, it may occur that the rotor 120 does not carry out any rotary movement. This is e.g. the case if the stator-flux vector 111 is generated in an orientation opposite or, respectively, anti-parallel to the rotor-flux vector 121, i.e. in an orientation rotated by 180°. However, a non-movement of the rotor 120 also occurs if the stator-flux vector 111 is turned up in the same orientation, i.e. congruently to the rotor-flux vector 121. Thus, no distinction can be made between these two differing situations. In case of the rotor 120 not moving during a first turning-up of the stator-flux vector 111, the amplifier 200 or, respectively, the control unit 210 is thus configured to again initiate the generation of the stator-flux vector 111 with a different orientation as well as to continue the rough adjustment as described above. The different orientation may e.g. be chosen to be rotated by an angle of 90° with regard to the previous orientation.

In case that a rotary movement does not occur in this different orientation, either, the amplifier 200 or, respectively, the control unit 210 may be configured to generate an error message which is e.g. optically or, respectively, acoustically outputted. This is e.g. the case if an engine break is (still) active or other circumstances preventing the rotary movement exist.

Furthermore, it may also be the case at the end of the rough adjustment of the vectors 111, 121, that the rotor 120, instead of carrying out a rotation (with reversed direction), does not carry out a rotary movement during turning-up of the stator-flux vector 111. This is the case if the rotor-flux vector 121 is not "overtaken" by the stator-flux vector 111, as indicated in FIG. 4C, but the stator-flux vector 111 is generated congruently to the rotor-flux vector 121. For this case, the control unit 210 may be configured to terminate rough adjustment and not to initiate any precise adjustment since the vectors 111, 121 are already congruent.

The method for rough and precise adjustment explained with reference to the above-mentioned Figures is not limited to rotary synchronous motors but may correspondingly be applied to linear synchronous motors in which a motor component may be translationally shifted with regard to the other motor component. For illustrative purposes, FIGS. 8A to 8C show the method for rough adjustment with respect to such a linear motor 300 in a schematic view.

The linear motor 300 comprises a stationary motor component 320, in the following referred to as secondary component 320 which provides a static magnetic field. The magnetic field of the secondary component 320 may e.g. be produced by means of a side-by-side arrangement of equally distanced permanent magnets with alternating polarity (not depicted). Apart from the secondary component 320, the linear motor 300 comprises a motor component 310 arranged on the secondary component 320 in a slidable manner, the motor component 310 being referred to as primary component 310 in the following. The primary component 310, also referred to as armature, comprises a plurality of electromagnets (not depicted) which generate a magnetic field by applying an electric current. By addressing the electromagnets of the primary component 310 in a phase-shifted manner by means of an alternating current, a translationally moving magnetic field, also referred to as travelling field, may be generated. At this, the travelling field of the primary component 310 interacts with the static magnetic field of the secondary component 320, resulting in a translational movement of the primary component 310.

Figure 8A:
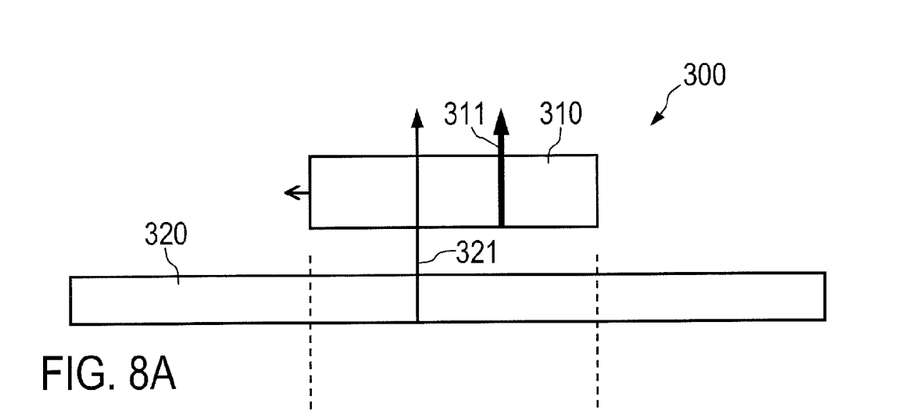
FIGS. 8A to 8C show a schematic view of a linear synchronous motor during an operational state for roughly adjusting magnetic fields.
Figure 8B:
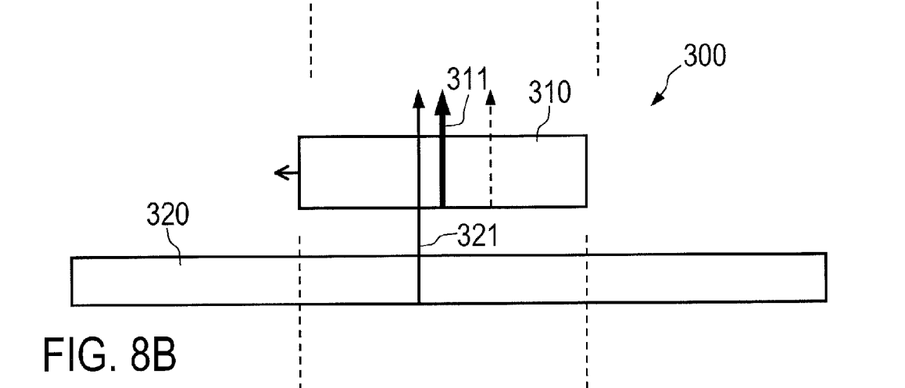
Figure 8C:
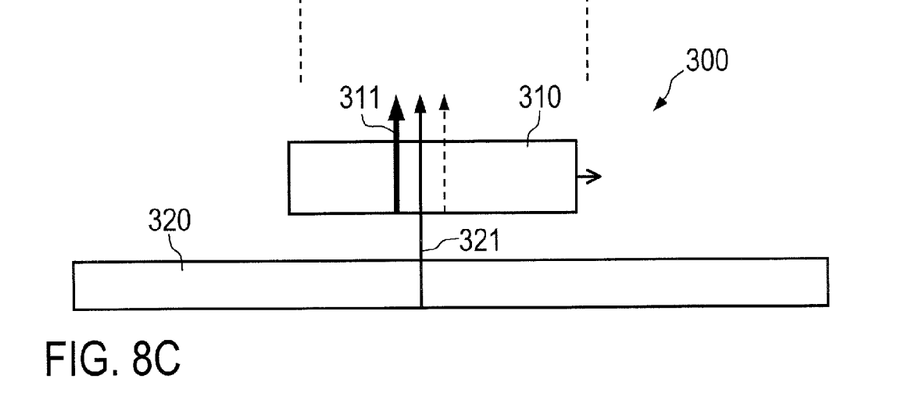

In order to illustrate the magnetic field of the secondary component 320 or its orientation, respectively, FIGS. 8A to 8C show a single magnetic flux vector 321 which is referred to as stator-flux vector 321 in the following. Strictly speaking, the stator-flux vector 321 only illustrates the field of two permanent magnets having different polarities, i.e. of a pole pair so that the following explanations refer to this one pole pair. The magnetic field of the primary component 310 is indicated by a flux vector 311, in the following referred to as armature-flux vector 311, the orientation of which may be "horizontally" shifted or changed, respectively.

Controlling of the linear motor 300 may be carried out analogously to the system of FIG. 1 by means of a corresponding amplifier 200 and by means of an incremental encoder 130 associated with the linear motor 300 (not shown), the encoder 130 being in this case configured to detect a translational movement of the primary component 310. For further details with regard to these components, reference is made to the above description which may be applied analogously. Here, the current supply of the primary component 310 may be effected via a trailing cable.

In the case of the linear drive 300, as well, the problem may occur due to the use of the inexpensive incremental encoder 130 that the absolute position of the primary component 310 with regard to the secondary component 320 is unknown. Generating a travelling armature-flux vector 311 by applying a rotary current to the primary component 310 for initiating a translational movement might thus have negative effects, such as a reduced drive torque, a fitful start-up of the primary component 310, an uncontrollable control process, damage to the linear drive 300 etc. Correspondingly, it is proposed to roughly adjust the magnetic fields of the primary component 310 and the secondary component 320 to each other in a first stage (FIGS. 8A to 8C), wherein rough adjustment is carried out with a relatively low overall movement of the primary component 310. In a second stage, precise adjustment is carried out, and starting from this state, the linear motor 300 may be activated to carry out a translational movement of the primary component 310.

As depicted in FIG. 8A, the armature-flux vector 311 is turned up in a first orientation, the strength of the armature-flux vector 311 being in turn increased starting from zero up to a predetermined value. The first orientation may e.g. be arbitrarily chosen or it may be predetermined. Usually, the first orientation of the armature-flux vector 311 is different from that of the stator-flux vector 321. Due to the increasing magnetic force, the armature-flux vector 311 and thus the primary component 310 are drawn in the direction of the stator-flux vector 321.

This occurring translational movement is detected (by means of the encoder 130) in order to determine the direction of movement of the primary component 310. At this, the occurring translational movement of the primary component 310 is again limited to a minimum value which is sufficient in order to be able to determine the direction of movement. For this purpose, the armature-flux vector 311 may be switched off immediately upon determining the direction of movement.

In a further step, the armature-flux vector 311 is turned up in an orientation which has been changed with regard to the first orientation by a predetermined "distance" or "section", respectively, as depicted in FIG. 8B. For better illustration, the position of the armature-flux vector 311 generated previously in the first orientation is additionally indicated in FIG. 8B by means of a dashed arrow. At this, the (new) orientation of the armature-flux vector 311 is changed depending on the previously determined direction of movement of the primary component 310 in order to change the orientation of the armature-flux vector 311 to be closer to the stator-flux vector 321. Since in the present case, the primary component 310, by means of which the armature-flux vector 311 is generated, may be moved and the secondary component 320 comprising the stator-flux vector 321 is stationary, the orientation of the armature-flux vector 311 is changed in a direction corresponding to the previously determined direction of movement of the primary component 310 (contrary to the synchronous motor 100 of FIG. 1).

With respect to turning up the armature-flux vector 311 according to FIG. 8B, again, the direction of movement of the movement of the primary component 310 limited to a minimum value is determined. The direction of movement is presently the same as for the armature-flux vector 311 previously generated in the orientation according to FIG. 8A.

Said method steps of generating the armature-flux vector 311 (with an orientation which has respectively been changed by the predetermined section) and of determining a direction of movement of the primary component 310 may be repeated until the armature-flux vector 311 "overtakes" the stator-flux vector 321, as depicted in FIG. 8C. In this context, the direction of movement of the primary component 310 reverses. In the exemplary sequence of FIGS. 8A to 8C, this state already exists in the third orientation of the armature-flux vector 311 when starting from the "initial situation" in FIG. 8A. In this state, the armature-flux vector 311 and the stator-flux vector 321 (or their orientations, respectively) are roughly adjusted to each other since the stator-flux vector 321 is now within the section provided by the two lastly turned-up armature-flux vectors 311.

After roughly adjusting the magnetic fields of the primary component 310 and the secondary component 320, the magnetic fields may moreover be precisely adjusted to each other or made congruent, respectively. For this purpose, as in the case of the rotary synchronous motor 100, two different embodiments may come into consideration (not depicted).

One procedure consists in again turning up the armature-flux vector 311 with an orientation which is positioned in the middle of the orientations of the two lastly generated armature-flux vectors 311. The strength of the armature-flux vector 311 is again increased starting from zero up to a predetermined value, so that the primary component 310 is drawn in the direction of the stator-flux vector 321 due to the increasing magnetic force, until both vectors 311, 321 are congruent. The translational movement of the primary component 310 taking place thereby corresponds at most to half of the orientation section used during rough adjustment, by which the orientation of the armature-flux vector 311 is respectively changed. This method may be considered for a linear motor 300 having a low adhesive friction, e.g. for an ironless linear drive with air bearing.

Alternatively, the armature-flux vector 311 may be generated starting from the lastly chosen orientation during rough adjustment, and the translational movement of the primary component 310 may be continuously detected. The armature-flux vector 311 is again turned up starting from zero up to a predetermined value, and the orientation of the armature-flux vector 311 is corrected or, respectively, adapted in such a way according to the translational movement of the primary component 310 until the primary component 310 no longer moves. In this context, the primary component 310 may be in the same position as at the beginning of precise adjustment. During the correction process, the vectors 311, 321 may be rendered congruent by means of a relatively small translational movement of the primary component 310.

Within the framework of rough adjustment of the linear motor 300, it may also occur that the primary component 310 does not or no longer carry out a translational movement during turning-up of the armature-flux vector 311. In case the primary component 310 does not move during a first turning-up of the armature-flux vector 311, it is proposed, as for the synchronous motor 100, to generate the armature-flux vector 311 with a different orientation, as well as continuing the rough adjustment process (as the case may be). In case that even with this different orientation a translational movement does not occur, an error message may be generated (by means of the amplifier 200) which is then outputted optically or, respectively, acoustically. This may e.g. be the case if an engine brake is (still) active or other circumstances exist which prevent movement of the primary component 310.

In case the primary component 310 does not move during the generation of the armature-flux vector 311, while the primary component 310 was respectively moved during previous turning-up of the armature-flux vector 311 (with different orientations), rough adjustment may be terminated and precise adjustment does not have to be initiated since the vectors 311, 321 are already congruent in this case.

The embodiments explained with reference to the drawings re-present exemplary embodiments of the invention. Moreover, embodiments are conceivable which represent further modifications or combinations of the described embodiments.

As an example, the method of rough and precise adjustment for the synchronous motor 100 depicted in FIG. 1, which depicts what is referred to as a stationary-armature machine, may also be used for what is referred to as an external pole machine in which the rotor is configured to generate a magnetic rotary field and the stator provides a magnetic d.c. field. This correspondingly applies to a linear drive, as well, in which contrary to the linear drive 300 of FIGS. 8A to 8C the primary component used for generating the magnetic travelling field is stationary and the secondary component used for providing the static magnetic field is configured in a slidable manner.

The preceding description describes exemplary embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

The invention claimed is:

1. A method for operating a synchronous motor, the synchronous motor comprising a first motor component and a second motor component which are movable relative to each other,
    wherein the first motor component is configured to generate a magnetic field,
    wherein the second motor component comprises a magnetic field which is static with regard to the second motor component,
    wherein in the case of a difference in the orientation between the magnetic fields of the first and the second motor component the first and the second motor component are moved relatively to each other,
    and wherein the magnetic field of the first motor component is gradually aligned in the direction of the magnetic field of the second motor component by carrying out the following method steps:
    a) generating a magnetic field by means of the first motor component in a predetermined orientation in order to generate a relative movement between the first and the second motor component limited to a predetermined value;
    b) determining a direction of movement of the limited relative movement between the first and the second motor component; and
    c) repeating method steps a) and b) until a change in the direction of movement of the limited relative movement between the first and the second motor component occurs,
    wherein during repetition of the method steps a) and b) in each case in method step a) a magnetic field having a changed orientation with regard to the previously generated magnetic field is generated by means of the first motor component, wherein the orientation of the magnetic field is respectively changed by a predetermined orientation section and depending on the determined direction of movement.

2. The method according to claim 1, wherein the first motor component is stationary and the second motor component is movable with regard to the first motor component, and wherein the orientation of the magnetic field generated by means of the first motor component is in each case changed in a direction opposite to the determined direction of movement.

3. The method according to claim 1, wherein the second motor component is stationary and the first motor component is movable with regard to the second motor component, and wherein the orientation of the magnetic field generated by means of the first motor component is in each case changed in a direction which corresponds to the determined direction of movement.

4. The method according to claim 1, wherein after method step c) a further magnetic field is generated by means of the first motor component, wherein the orientation of the further magnetic field is chosen to be in the middle between the orientations of the two magnetic fields generated lastly by means of the first motor component and the strength of the further magnetic field is increased starting at zero up to a predetermined value.

5. The method according to claim 1, wherein after method step c) a further magnetic field is generated by means of the first motor component starting from the last orientation and the relative movement between the first and the second motor component is determined, wherein the strength of the further magnetic field is increased starting from zero up to a predetermined value and the orientation of the further magnetic field is changed until the relative movement between the first and the second motor component comes to a halt.

6. The method according to claim 1, wherein method step a) comprises increasing the strength of the magnetic field starting from zero.

7. The method according to claim 1, wherein the relative movement between the first and the second motor component generated in method step a) is terminated after passing through the predetermined value of the relative movement by switching off the magnetic field generated by means of the first motor component.

8. The method according claim 1, wherein in the case that during a first generation of a magnetic field by means of the first motor component in the predetermined orientation no relative movement is generated between the first and the second motor component in method step a), a different orientation is predefined and method step a) is carried out again with the different orientation.

9. An amplifier for operating a synchronous motor, the synchronous motor comprising a first motor component, a second motor component and an encoder,
- wherein the first motor component is configured to generate a magnetic field,
- wherein the second motor component comprises a magnetic field which is static with regard to the second motor component,
- wherein in the case of a difference in the orientation between the magnetic fields of the first and the second motor component a relative movement between the first and the second motor component occurs which is determinable by means of the encoder,
- wherein the amplifier comprises a power unit and a control unit,
- wherein the power unit is configured to provide an electric current to the first motor component for generating a magnetic field in different orientations,
- wherein the control unit is configured to control the power unit and to evaluate the relative movement determined by means of the encoder,
- wherein the control unit is further configured to initiate a gradual alignment of the magnetic field of the first motor component in the direction of the magnetic field of the second motor component within the framework of starting the operation of the synchronous motor, which is effected in that the control unit
- initiates in a method step a) the generation of a magnetic field by means of the first motor component in a predetermined orientation in order to generate a relative movement between the first and the second motor component limited to a predetermined value,
- determines in a method step b) a direction of movement of the limited relative movement between the first and the second motor component by means of the encoder, and
- repeats the two method steps a) and b) until a change in the direction of movement of the limited relative movement between the first and the second motor component occurs,
- wherein during repetition of the method steps a) and b) the control unit in each case initiates in method step a) that the magnetic field is generated by means of the first motor component having a changed orientation with regard to the previously generated magnetic field, wherein the orientation of the magnetic field is respectively changed by a predetermined orientation section and depending on the direction of movement determined by means of the encoder.

10. The amplifier according to claim 9, wherein the control unit is further configured, after repetition of method steps a) and b), to initiate the generation of a further magnetic field by means of the first motor component, the orientation of the further magnetic field being chosen in the middle between the orientations of the two magnetic fields generated lastly by means of the first motor component and the strength of which being increased starting from zero up to a predetermined value.

11. The amplifier according to claim 9, wherein the control unit is further configured, after repetition of method steps a) and b), to initiate the generation of a further magnetic field by means of the first motor component starting from the last orientation, the strength of which being increased starting from zero up to a predetermined value and the orientation of which being changed until the relative movement between the first and the second motor component comes to a halt.

12. The amplifier according to claim 9, wherein the control unit is configured to initiate in method step a) that the strength of the magnetic field is increased starting from zero.

13. The amplifier according claim 9, wherein the control unit is configured to initiate a termination of the magnetic field generated in method step a) by means of the first motor component, provided that the relative movement between the first and the second motor component determined by means of the encoder has passed through the predetermined value.

14. The amplifier according to claim 9, wherein the control unit is configured, in the case that during a first generation of a magnetic field by means of the first motor component in the predetermined orientation no relative movement is generated between the first and the second motor component in method step a), to initiate the generation of a magnetic field by means of the first motor component in a different orientation in order to carry out method step a) again with the different orientation.

15. A system comprising an amplifier and a synchronous motor, wherein the synchronous motor comprises a first motor component, a second motor component and an encoder,
- wherein the first motor component is configured to generate a magnetic field,
- wherein the second motor component comprises a magnetic field which is static with regard to the second motor component,
- wherein in the case of a difference in the orientation between the magnetic fields of the first and the second motor component a relative movement between the first and the second motor component occurs which is determinable by means of the encoder,
- wherein the amplifier comprises a power unit and a control unit,
- wherein the power unit is configured to provide an electric current to the first motor component for generating a magnetic field in different orientations,
- wherein the control unit is configured to control the power unit and to evaluate the relative movement determined by means of the encoder,
- wherein the control unit is further configured to initiate a gradual alignment of the magnetic field of the first motor component in the direction of the magnetic field of the second motor component within the framework of starting the operation of the synchronous motor, which is effected in that the control unit
- initiates in a method step a) the generation of a magnetic field by means of the first motor component in a predetermined orientation in order to generate a relative movement between the first and the second motor component limited to a predetermined value,
- determines in a method step b) a direction of movement of the limited relative movement between the first and the second motor component by means of the encoder, and
- repeats the two method steps a) and b) until a change in the direction of movement of the limited relative movement between the first and the second motor component occurs,
- wherein during repetition of the method steps a) and b) the control unit in each case initiates in method step a) that the magnetic field is generated by means of the first motor component having a changed orientation with regard to the previously generated magnetic field, wherein the orientation of the magnetic field is respectively changed by a predetermined orientation section and depending on the direction of movement determined by means of the encoder.

16. The system according to claim 15, wherein the control unit is further configured, after repetition of method steps a) and b), to initiate the generation of a further magnetic field by means of the first motor component, the orientation of the further magnetic field being chosen in the middle between the orientations of the two magnetic fields generated lastly by means of the first motor component and the strength of which being increased starting from zero up to a predetermined value.

17. The system according to claim 15, wherein the control unit is further configured, after repetition of method steps a) and b), to initiate the generation of a further magnetic field by means of the first motor component starting from the last orientation, the strength of which being increased starting from zero up to a predetermined value and the orientation of which being changed until the relative movement between the first and the second motor component comes to a halt.

* * * * *